(No Model.)
J. C. MICHAEL.
POWDER DIVIDER.
No. 368,227. Patented Aug. 16, 1887.
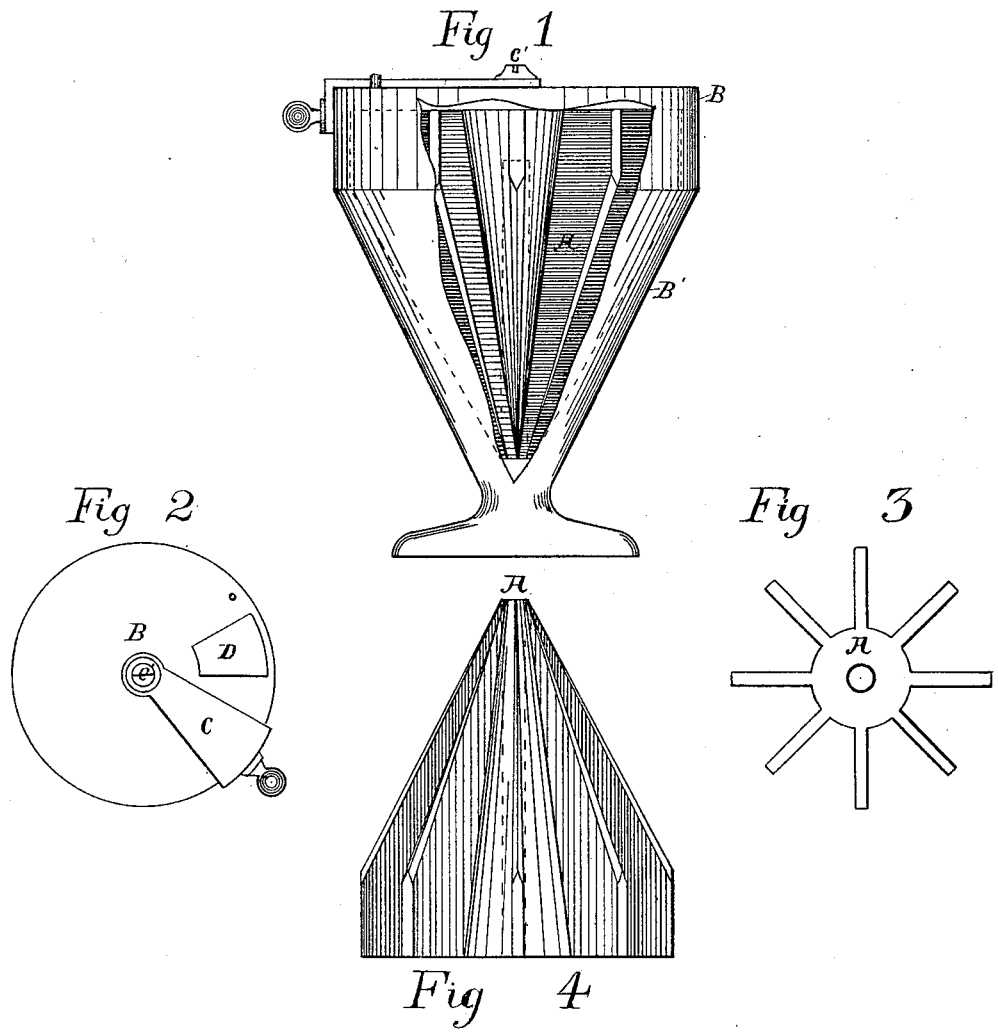
Attest
Geo. B. Michael,
L. B. Meek
Inventor
Jacob C. Michael
by
R. W. McDermott
his Atty

United States Patent Office.

JACOB C. MICHAEL, OF DENVER, COLORADO.

POWDER-DIVIDER.

SPECIFICATION forming part of Letters Patent No. 368,227, dated August 16, 1887.

Application filed June 5, 1886. Serial No. 204,227. (No model.)

*To all whom it may concern:*

Be it known that I, JACOB C. MICHAEL, a citizen of the United States, residing at Denver, in the county of Arapahoe and State of Colorado, have invented a new and useful Powder-Divider, of which the following is a specification.

My invention relates to improvements in apparatus for dividing powdered substances into as many equal parts as desired; and the object of my invention is to provide an apparatus that with little trouble will accurately divide powdered substances and deliver the portions so divided separately into any desired receptacle. I attain this object by the mechanism illustrated in the accompanying drawings, in which—

Figure 1 is a side view with a portion torn away, showing the blade-cone in place in the interior of the cup. Fig. 2 is a top view of the cover, showing the gate and the outlet. Fig. 3 is a top view of the cone, and Fig. 4 a side view of the cone inverted.

Similar letters refer to similar parts throughout the several views.

The cup B' is formed inside so it will exactly fit the sharpened edges of the blades on the cone A to the point where they reach the top. In the center of this funnel-shaped cup B' is a perpendicular pin, on which the cone A is lowered into the cup, and which guides it in its descent, the cone having a hole through its center, as shown in Fig. 3, for the purpose of receiving the pin, and which must fit it nicely, and on which it revolves. The cap or cover B is held in position on top of the cup by the perpendicular edges of the blades on the cone A. (Shown in Figs. 1 and 4.) In the top of this cover B is formed an opening, D, Fig. 2, corresponding to the open space between the blades on the cone A. Pivoted to the center of the cover is the gate c, which, when it is desired, may be rotated to cover or uncover the opening D.

In operating the apparatus the cap or cover is removed and the cone taken out. The powder to be divided is then placed in the cup and made as level as possible on its top. The cone is then placed (point down) on the perpendicular pin, and as it is pressed down cuts the powder into as many divisions as there are space between the blades on the cone, (and which may be as numerous as the case in hand demands. When the point of the cone has reached th bottom of the cup, the division is completed The cover is then placed in such a position o top that the opening D is exactly over a spac between two blades of the cone with the gat closed. To deliver the divided portions th apparatus is then inverted, the powder fallin into the cap or cover. The cup is then raise off the cone and the gate opened, when th powder above the gate will drop out. Th cone is then revolved, which carries anothe portion over the opening, and so on until a are delivered into or onto any desired recep tacle.

Having now fully described my inventio what I claim as new, and desire to secure b Letters Patent, is—

The combination of the conical cup, th conical divider insertible in the cup charge with the material to be divided and having series of blades effecting equal division of th contents of the cup, the central guide for th divider, and the cover, said cover having a di charge-opening and gate adapted for the d visions separately, the whole being invertibl the conical cup removable from the divide and the divider revoluble in the cover, sul stantially as described.

JACOB C. MICHAEL.

Witnesses:
B. L. POLLOCK,
GEO. B. MICHAEL.